LASER DATA RECORDER

INVENTOR.
CLAUS M. ASCHENBRENNER
HSUEH Y. HSIEH
RICHARD L. LIBBY
BY
Curtis Ailes
THEIR ATTORNEY.

INVENTOR.
CLAUS M. ASCHENBRENNER
HSUEH Y. HSIEH
RICHARD L. LIBBY

BY Curtis Ailes
THEIR ATTORNEY.

LASER DATA RECORDER

Filed Jan. 6, 1965 Sheet 3 of 3

INVENTOR.
CLAUS M. ASCHENBRENNER
HSUEH Y. HSIEH
RICHARD L. LIBBY

BY Curtis Ailes

THEIR ATTORNEY.

United States Patent Office 3,438,050
Patented Apr. 8, 1969

3,438,050

LASER DATA RECORDER

Claus M. Aschenbrenner, Lexington, Mass., and Hsueh Y. Hsieh, Ossining, and Richard L. Libby, Yorktown Heights, N.Y., assignors to Itek Corporation, Lexington, Mass., a corporation of Delaware Filed Jan. 6, 1965, Ser. No. 423,801
Int. Cl. G01d 9/28; H01s 3/12; G02f 1/26
U.S. Cl. 346—49 10 Claims

ABSTRACT OF THE DISCLOSURE

A system is disclosed herein which includes a laser for recording by the means of light images upon the face of a photosensitive medium which is rotated by a drive motor. The beam of light projected upon the medium is modulated by an electrical pulse train and the latent image is thereafter developed to produce an irreversible record of the data represented by the pulse train.

This invention relates to a novel method and apparatus for data storage employing photograph storage techniques. More particularly, the present invention relates to improved methods and apparatus for accomplishing data storage very rapidly at a very high data density by an improved method which eliminates steps required by former methods, and by means of improved apparatus which is characterized by greater simplicity and very reliable operation.

The invention is particularly applicable to high density optical data storage systems. Such systems employ photographic techniques to record information in the form of alternate light and dark areas on photosensitive surfaces of disks, drums or tapes. The light areas may be transparent or translucent and the dark areas absorptive or reflective. The presence of a light or dark area may indicate a binary zero or one. Alternatively, a light-dark sequence may indicate one digit, with the other digit indicated by a dark-light sequence. Information is retrieved from the recording medium by passing it through a light beam and thus scanning, by means of a photodetector on the opposite side of the medium, the succession of light and dark areas. Alternatively, the difference in reflectivity of light and dark areas may be employed.

Because of the high resolution of photosensitive materials and the extremely high resolution obtainable in optical systems, optical storage systems are ultimately capable of relatively high information densities. The highest resolution photosensitive materials required for information densities are sometimes referred to as fine-grained materials. However, these fine-grained materials are generally photographically slow. That is, they do not react rapidly to optical signals of a particular intensity. Unfortunately, available light beams which can be modulated at speeds approaching that of present high speed computer input-output systems in order to impart data to photographic data storage media have generally been of relatively low light intensity such as those from cathode ray tubes or xenon lamps. With such low light intensities, the fine-grained film is much too slow.

One of the methods which has been used in the past for overcoming the above problem has been to employ two separate photographic stages. In such prior method, the data is photographically recorded as rapidly as possible using a fast photographic material having a coarse grain, and this initial photographic recording is made without the close packing of data which is ultimately desired. The data is then transferred and optically reduced in physical scale by means of a photographic transfer process to the fine-grained photographic material and in closely spaced relationship to achieve the high density storage desired. The difference in exposure speeds between the fast coarse grained film used for the initial photographic step, and the slower fine-grained film used for the second photographic step is rather striking, being in the order of one hundred to one. In order to achieve reasonable speed in the photographic transfer step, a number of data tracks are photographically transferred to the fine-grained material in parallel. As a matter of convenience, the first photographic step is carried out by recording the data on conventional strips of seventy millimeter film even though it is ultimately desired to record by the second step on a photographic disk. Because of the difference in the forms of these two photographic recordings, the transfer of data from the photographic strip to the photographic disk involves serious complications and complexities in both method and apparatus. In addition, the system involves serious processing time delays and the consumption of vast amounts of film.

Such a prior art data photographic storage system is disclosed for instance in a report dated June 20, 1959, and identified as follows: RADC–TR59–110, Final Report on Computer Set, AN/GSQ–16 (XW–1), volume III, The Disc Making Unit, Prepared for the Intelligence Laboratory, Rome Air Development Center (ARDC), Griffiss Air Force Base, New York, AF 30(602)–1823.

Accordingly, it is an important object of the present invention to provide improved and simplified rapid photographic recording of data at very high data densities.

It is another important object of the present invention to provide rapid, high density, photographic data recording by a single photographic process which does not require intermediate photographic recording as a separate photographic step.

In producing a high data density photographic disk, some of the difficulties which have been encountered in transferring the data from a photographic strip to a photographic disk arise from the fact that it has been found to be necessary for the achievement of reasonable speed to transfer a number of data tracks in parallel. One of the resultant difficulties has been in accurately closing the ends of the data tracks upon themselves as they are photographically recorded on the disk. This closure of the data track, or of the indexing track accompanying the data track, is a requirement of the systems in which photographic data disks are commonly used.

Another object of the present invention is to provide high density photographic data storage in circular tracks in which great accuracy is attainable in projecting both a servo track and a data signal in a data track to a circular photogrphic medium and in which closure of the servo track is simplified.

Because of the requirements and limitations of the prior art systems as described above, data has usually been photographically recorded on disks in the form of concentric circular tracks. However, the use of circular tracks involves an inconvenience and delay, particularly in the recordation of the data, because of the necessity for radial indexing of the photographic disk to a new track radius before the start of the recordation of each data track.

Accordingly, it is an object of the present invention to provide a system of the above description in which data may be recorded on a single spiral track without the need for interruption of the recordation process for indexing to a new track radius at periodic intervals.

As will appear from the following description, the remarkable speed with which the present process is capable of operating, and the fact that the system of the present invention is capable of operation in a single photographic process, are particularly important in making possible the recordation of data in a spiral record form.

Another serious problem which is encountered in attempting to record digital data serially with a single recording channel on a high density multiple data track photographic storage medium is that a considerable period of time is required for the exposure of the entire record before development and fixing of the photographic images can be undertaken. In this period of time, the exposed but undeveloped latent photographic image for the first data which is recorded is subject to a certain amount of decay before the last of the data is recorded.

Accordingly, another object of the present invention is to record a large amount of data at high density within a very short time on a single photographic medium and by a single photographic process which avoids or minimizes the deleterious effect of the decay of the undeveloped latent photographic image.

Another object of the present invention is to photographically record information upon a photographic medium with a narrow high intensity light beam which is modulated with the information to be recorded and focused into a sharply defined light spot of suitable size and shape.

Prior methods of recording data photographically at high densities have generally required elaborate apparatus for carrying out the process and including special precautions such as vacuum pumps and cooling systems.

It is another object of the present invention to provide an improved photographic data recording system which does not require vacuum pumps and elaborate cooling systems.

In prior photographic data recording systems in which the data is first recorded on a strip and then photographically transferred from the strip to a disk, one of the inherent features has been that data recorded at different track diameters often occupy different angular spaces. That is, the data is recorded with a nonuniform angular spacing. This means that if a uniform rotational speed of the data disk is maintained, then there is necessarily a nonuniform reading rate for the data stored on the various data tracks. Thus, the data utilization system must be designed to accommodate for nonuniformity in data reading speed, and to accommodate for the fastest and the slowest reading rates, without danger of false or erroneous opertion.

Accordingly, it is another object of the present invention to photographically record data on circular tracks of different diameters at a uniform angular speed so as to provide the advantages of constant speed data read-out.

Another object of the present invention is to reduce the time between the first availability of information to be recorded, and the completion of the recording process, so that "buffer storage" requirements can be minimized.

In prior art data storage systems such as those described above, the information has been stored entirely in terms of sequences of "black and white" or substantially fully exposed or unexposed areas. Such systems have generally been considered to be limited to the storage of digital data involving "on" and "off" signals in contrast to analog signals which may have smoothly varying amplitudes or values.

It is one of the objects, features, and advantages of the present invention to provide a photographic data storage system of the above description which is capable of high-density recordation of analog information.

It is another object of the present invention to provide for rapid, high density, photographic storage of analog information in systems of the above description without the necessity for conversion of the analog information to digital form within the usual meaning of such a conversion.

In carrying out the above objects of this invention in one preferred form thereof, a narrow beam of coherent light having a planar wave front is controlled to represent the information to be recorded. The controlled beam is then focused upon a photographic medium while maintaining a relative movement between the beam and the photographic medium, and then the photographic medium is developed and fixed.

Further objects, advantages, and features of the invention will be apparent from the following discription and the accompanying drawings which are as follows.

One preferred form of the method of the present invention may be described in more detail as follows: A very narrow but intense beam of polarized coherent light having a planar wave front composed of essentially parallel light rays is obtained from a suitable source such as a laser. The beam from the laser is turned "on" and "off" in accordance with the information which is to be recorded. This modulation of the light beam from the laser may be accomplished either by controlling the laser directly or by using an electrically controlled shutter arrangement to interrupt the optical transmission of the light beam. The narrow light beam is then optically spread by a lens system, passed through a suitable diffraction mask to produce a desired energy distribution within the beam, and then focused through a suitable lens system to a photographic medium upon which the information is to be stored. The photographic medium is maintained in uniform motion travelling past the point of focus of the modulated beam containing the information so that certain areas are exposed and other areas are not exposed to thereby record the information. The information carrying beam of light is preferably focused and projected upon the photographic surface in a direction perpendicular to that photographic surface.

The information is preferably stored in a single spiral track or in a series of concentric tracks on a flat disk of photographic material. The order of recording preferably proceeds with the inside tracks at the smaller diameters being recorded first, and the outside tracks at the larger diameters being recorded last. The rotational speed of the photographic disk is preferably maintained substantially constant, and the rate of data modulation of the light beam is preferably accomplished at a uniform speed so that the angular spacing of the individual digits of information is substantially the same on all of the data tracks of the disk. Thus, the linear spacing is greater on the outside tracks than it is on the inside tracks to maintain the uniform angular spacing of the data and a uniform reading speed in the apparatus which employs the photographically stored information.

By maintaining a uniform angular speed of the photographic disk, the optical energy per unit area is greater on the inside tracks and less on the outside tracks. When the disk has been completely exposed and is ready to be photographically developed, a greater decay time has elapsed with respect to the exposed but undeveloped inner tracks than with respect to the outer tracks. However, the image is still sharp and clear on the inner tracks and no information is lost because the optical energy per unit area on the inner tracks has been greater than on the outer tracks. Despite the greater elapsed time for decay, the information is accurately retained on the inner tracks because of the higher initial optical energy per unit area.

Figure 2:
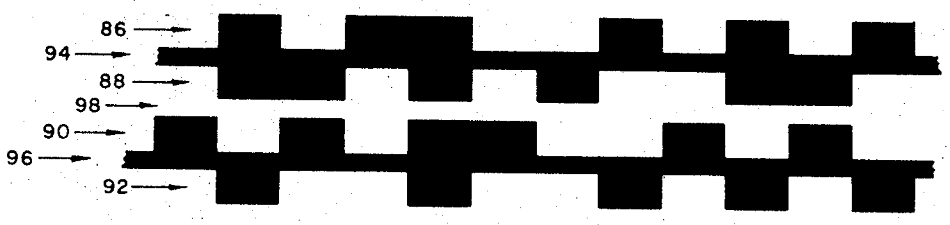
FIG. 2 illustrates a possible arrangement of photographically recorded digital information for use with the present invention.

Another feature of the preferred method of the invention consists in providing an additional beam of light which bypasses the diffraction mask and enters the focusing lens system at a slight angle with the information modulated beam, thus producing on the photographic medium a second light spot which serves to record a servo indexing track. This is simply a continuous indexing track adjacent to the data track. The patterns in which the data and servo tracks may be photographically recorded are illustrated in FIG. 2, which is explained in more detail below.

Figure 1:
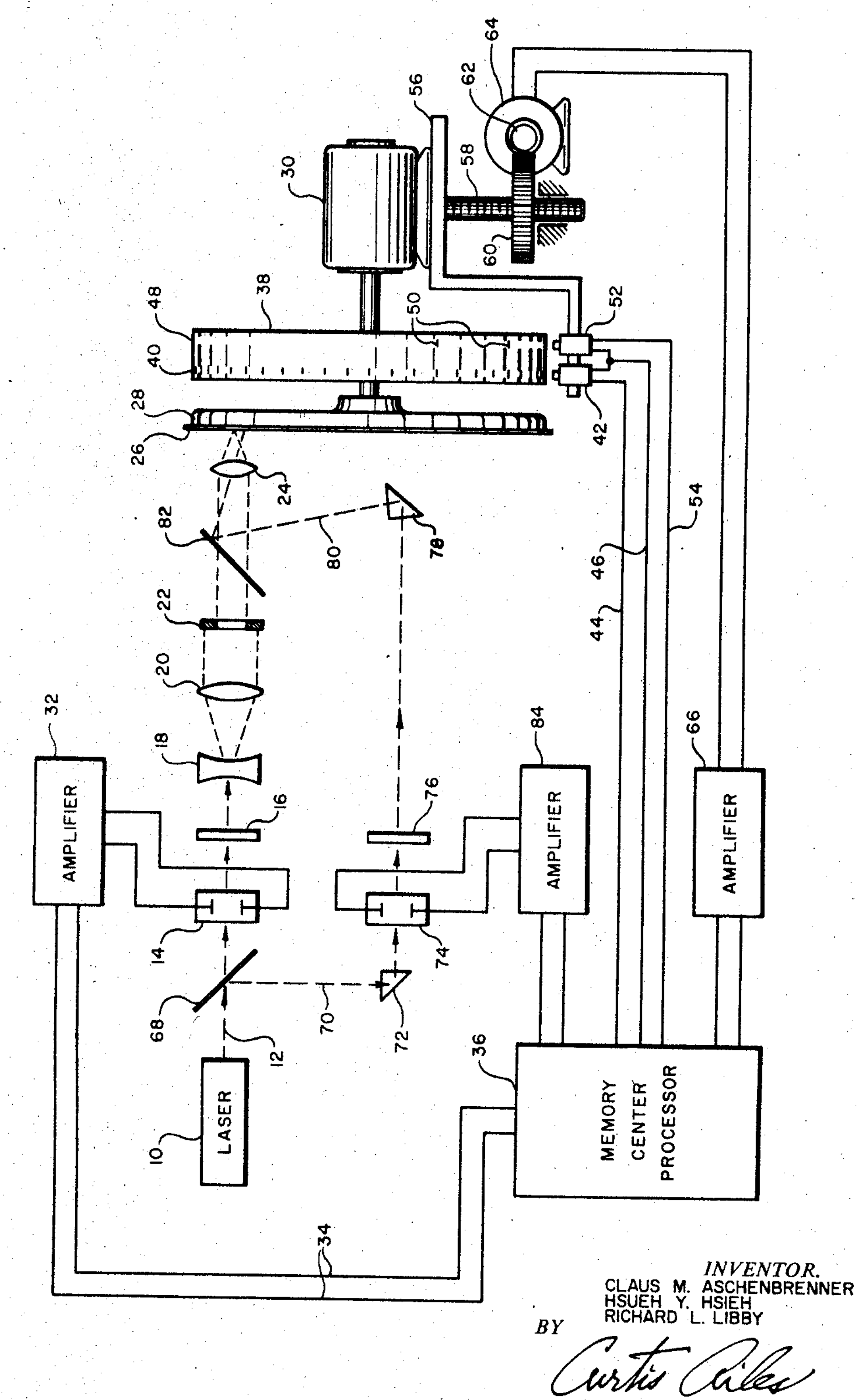
FIG. 1 is a schematic representation of an optical data storage system embodying the invention.

FIG. 1 is a schematic diagram illustrating a preferred form of apparatus for carrying out the present invention. This apparatus is briefly described as follows:

A narrow and intense beam of polarized light is produced by a laser 10 being emitted as indicated at 12. It is then modulated by the combination of a Kerr cell 14 and a polarizer 16, and passes through lenses 18 and 20, a diffraction mask 22, and a focusing lens 24 to a photographic disk 26. The plane corresponding to the surface of disk 26 at which the light is focused by lens 24 is sometimes referred to hereinafter as a predetermined plane of focus. The photographic disk 26 is supported upon a supporting disk 28 which is rotated at a uniform speed by an electric motor 30. The modulation of the light beam by the Kerr cell 14 is carried out in response to a voltage derived from an amplifier 32, which in turn is operable in response to signals transmitted through lines 34 from a memory center processor 36.

The memory center processor may consist of a general purpose stored program computer such as the Honeywell 200 computer. The memory center processor may also consist of a simpler arrangement of apparatus, including logical elements, especially adapted for accomplishing the functions required of the memory center processor in this system. In either case, this component of the system of FIG. 1 preferably includes a means for reading data which has been previously recorded in another form, such as on punched paper tape, punched cards, or magnetic tape in order to rapidly provide the required information to the amplifier 32 for photographic storage on the disk 26.

The storage of digital data under the control of the memory center processor 36 is preferably synchronized with the physical rotation of the photographic disk 26 by means of signals derived from a magnetic drum 38. For this purpose, the drum 38 includes a track indicated at 40 with a series of regularly recorded magnetic spots which may be detected by a magnetic pick-up head 42, the resultant signals from which are transmitted through wires 44 and 46 to the memory center processor 36. The magnetic spots recorded on the track 40 are regularly spaced and provide synchronizing signals for the regularly spaced recordation of data on the photographic tracks of the disk 26. A second magnetic track is provided on the drum 38 as indicated at 48. The magnetic track 48 may include only one or two magnetically recorded spots, as indicated at 50, for indicating that a single data track has been filled. Other spots may also be recorded in the track 48 for various control purposes such as for beginning the recordation of data, for ending the recordation of data, signals for completing the opaque servo indexing tracks adjacent to the data tracks, and so forth. The signals from the magnetic track 48 are picked up by a magnetic pick-up head 52 and transmitted to the memory center processor 36 through electrical connections 46 and 54.

The motor 30 and the associated apparatus including the supporting disk 28; the magnetic drum 38, and the magnetic heads 42 and 52, are supported upon a vertically adjustable platform 56. The vertical adjustability of this platform is schematically illustrated by means of a rotatable nut 60. The nut 60 is formed as a gear on its external periphery. This gear meshes with a worm gear 62 rotatable by a motor 64. The motor 64 is energized from an amplifier 66 in response to signals from the memory center processor 36. Thus, whenever vertical adjustment of the photographic disk 26 is required, the motor 64 rotates the nut 60 and adjusts the vertical position of the motor 30, and the photographic disk 26, and all of the associated apparatus. In order to simplify the schematic drawing of FIG. 1 and to make the explanation of the operation of the system as simple as possible, the platform 56 and disk 26, and the other associated apparatus, have been shown vertically adjustable as described above. However, it should be understood that it is preferred to adjust the indexing positioning of the photographic disk 26 by horizontal, rather than vertical, adjustment movement. It will be quite apparent that this is possible. This alternative is preferred because the indexing movement forces of the indexing motor 64 thereby do not have to lift the weight of the platform 56, and the associated apparatus, but need only provide a horizontal-translational movement. Thus, it is simpler to provide for a smooth indexing movement.

At the laser 10, a partially reflective mirror 68 is provided which permits the direct transmission of a major fraction of the light beam output of the laser 10 to the Kerr cell 14, but at the same time reflects a minor fraction of the light beam downwardly as indicated at 70. The beam 70 is again reflected by a prism 72, transmitted through a Kerr cell 74, a polarizer 76, and again reflected by another prism 78. The resultant upwardly deflected beam as indicated at 80, again is reflected by a partially reflective mirror 82 and then enters the focusing lens 24 at a slight angle with the data beam. This light beam which is schematically illustrated at 70 and 80 is "on" continuously during the recordation of a particular data track, and serves to photographically record a servo indexing track adjacent to the data track as illustrated and explained in more detail in conjunction with FIGS. 2 to 5 below. The Kerr cell 74 is operable in conjunction with polarizer 76 in response to signals derived from an amplifier 84, and which in turn is operable in response to signals from the memory center processor 36, to modulate the light beam 80. It is necessary to interrupt the beam 80 for instance in recording circular tracks when shifting from the recordation of one data track to the recordation of the next data track by vertically adjusting the photographic disk 26. In this way the exposure of a line from one indexing track to the next, and the resultant blurring of data tracks, is avoided.

Thus, when the magnetic markers 50 of the magnetic tract 48 indicate the end of the recordation of a particular data track, the recordation of data is interrupted and the memory center processor 36 signals amplifier 84 to cause the Kerr cell 74 to act as a shutter to turn off the indexing light beam 80. At the same time the amplifier 66 is energized to cause the motor 64 to move the table 56 downwardly to establish the radius of the next data track. After this adjustment is accomplished the motor 64 is stopped, and the recordation of data on the new data track is commenced. As will appear below, each indexing track serves two data tracks when the data is recorded in concentric circles, a data track appearing on each side of each indexing track. Accordingly, the indexing light beam 80 is maintained "off" by the Kerr cell 74 during the next entire data track cycle, and it is turned on again only after the next following track indexing movement of the table 56.

However, it if the data is recorded in spiral form, the indexing track preferably is continuously recorded, without interruption, along with the data. The indexing motor 64 is then continuously energized at a low speed which is coordinated with rotation of the disk 26. For spiral recording, in order to maintain precise coordination between the rotation of the disk 26 and the radial indexing movement thereof, it is preferable to derive the power for the radial indexing motion from the motor 30 through a suitable clutch and gear train, rather than from the separate motor 64.

For recordation of data in circular tracks, it is preferable for maximum speed of indexing movement of the disk 26 between data tracks to drive the indexing mechanism for the table 56 through an electrically actuated clutch from the motor 64. Motor 64 is then run continuously so that the acceleration time of the motor does not delay the indexing operation.

FIG. 2 shows the manner in which data may be recorded on the disk 26 of FIG. 1. A multiple track system is used with a series of concentric circular tracks extending around the disk. Fragments of four of these tracks are shown in FIG. 2 and indicated generally at 86, 88, 90, and 92. Each track comprises a series of successive opaque squares and transparent or translucent squares. By way of example, the binary "zero" may be represented by a translucent square followed by an opaque square. A binary "one" is the reverse. A system of this type is described in U.S. Patent No. 2,843,841 and therefore the details need not be repeated here, although certain features of significance with regard to the present invention will be discussed. In any case, it should be understood that the invention is not limited to any particular arrangement of optically recorded data.

With further reference to FIG. 2, the tracks are arranged in pairs 86–88 and 90–92, with the tracks in each pair being separated by the opaque indexing strips 94 and 96. The pairs of tracks are separated from each other by translucent strips 98. While each of the track and strip segments of FIG. 2 constitutes a small arc of a circle, the tracks and strips have been enlarged so much as represented here, and the segments shown constitute such a short arc that the curvature would be imperceptible. Therefore, no attempt has been made to represent the curvature.

In recording the digital data in the patterns shown in FIG. 2, it is desirable to have a very sharply defined light spot of proper and precise shape projected upon the photographic surface. By this it is meant that the projected spot should have very sharply defined edge portions. To accomplish this in the system as illustrated in FIG. 1, the diameter of the narrow beam coming from the laser 10 is optically widened by passage through a lens system, consisting of a concave lens 18 and a convex lens 20, to such an extent as to fill the aperture of the focusing lens 24. Without any further optical means, the focusing lens 24, which has a circular aperture, would focus the laser beam into a circular small light spot, surrounded by a system of concentric diffraction rings, forming a diffraction pattern. In order to attain the desired shape of the light spot, that is rectangular with sharply defined edges and corners, the diffraction mask 22 is inserted into the beam. This diffraction mask consists essentially of an opaque screen with one or more openings having such a configuration that its edges produce in the focus of the focusing lens 24 a diffraction pattern, the intense core of which has the desired shape.

Figure 3:
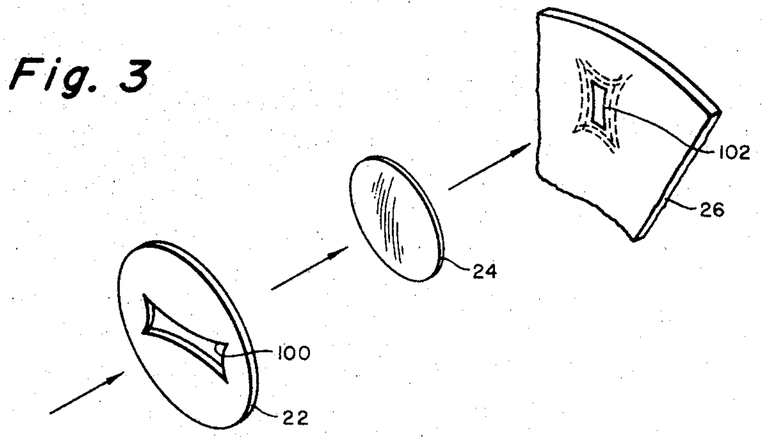
FIG. 3 is a schematic perspective view illustrating a diffraction mask which may be employed in the present invention for properly defining a beam of light to produce a light spot for recording information, and also illustrating projection of the spot.

FIG. 3 is a schematic perspective view which illustrates a preferred configuration for the diffraction mask 22. The mask is preferably provided with a narrow opening 100, having a shape resembling an hourglass. This hourglass shape has been found to produce the desired diffraction pattern shape. FIG. 3 also illustrates the effect produced by the diffraction mask. The radiation which passes through the aperture 100 and lens 24 produces a final radiation pattern as shown at 102 on disk 26.

Figure 4:
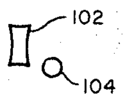
FIG. 4 illustrates the cross-sectional configuration of the primary energy pattern of two light beams imaged at the recording medium which may be employed in carrying out the present invention for simultaneously recording digital data, and the adjacent servo track, in a form such as shown in FIG. 2.

FIG. 4 illustrates the complete of light which is projected upon the photographic surface of the disk 26 of FIG. 1. The radiation pattern for the data beam resulting from the light which passes through the aperture 22 is again indicated at 102, and the focused spot of light for the creation of the continuous indexing line, such as 94 and 96 in FIG. 2, is indicated at 104. This focused light beam spot 104 results from the beam 80 of FIG. 1. As previously mentioned in connection with the description of FIG. 1, both of the beam resulting in the spots 102 and 104 of FIG. 4 are focused by the common focusing system including the lens 24. This employment of a common lens system in the final focusing stage is very advantageous in that precise registration of the two focused light spots is easily maintained.

Figure 5:
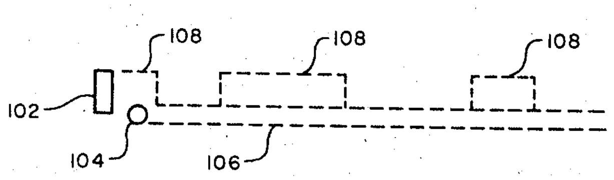
FIG. 5 illustrates how the photographic recording is made by modulating the data beam "on" and "off" while maintaining a uniform motion of the photographic medium under the beam.

FIG. 5 illustrates the process of the actual exposure of the servo and data tracks. The indexing spot 104 is seen to provide exposure of a continuous servo track by reason of the relative motion between the focused light spot and the photographic disk caused by the rotation of the disk. Similarly, as the data spot 102 flashes "on" and "off" to give in indication of the digital data, the resultant exposed data images, as indicated at 108, are elongated by reason of the sweep of the photographic material under the data spot 102 during the intervals while the data spot 102 is turned "on." In this way, a narrow illumination spot 102 causes the recordation of a relatively broad rectangular data spot 108.

The information data track in which the spots 108 of FIG. 5 are recorded may be considered to correspond to the data track 86 of FIG. 2, and the continuous indexing track 106 of FIG. 5 will then correspond to the continuous indexing track 94 of FIG. 2. With further reference to FIG. 2, when the second data track 88 associated with indexing track 94 is to be recorded, the recording disk 26 is appropriately adjusted in position, and the indexing track spot 104 is turned "off" during the complete recording cycle for the data track 88. The generation of an additional indexing track for the data track 88 is unnecessary since the previously generated indexing track 94 serves this purpose. The interruption of the indexing track light spot 104 is easily accomplished by the operation of the Kerr cell 74 shown in FIG. 1 and previously described in connection with that figure.

For the photographic disk 26, various fine-grain, high resolution photographic materials may be employed. Since the laser 10 provides monochromatic light, care must be exercised to select a photographic material which is sensitive to the particular wave length of such monochromatic light. If the laser 10 is a helium-neon laser, providing a light beam in the red part of the spectrum having a wave length of 6,328 angstroms, a suitable photographic material is the emulsion available from the Eastman Kodak Company under the product designation No. 649F. With this photographic material, and with the helium-neon laser employed in the system illustrated in FIG. 1, data writing speeds in the order of 500,000 binary digits per second are achievable. This recording speed is a tremendous improvement even over the recording speed achieved in the first photographic step in the prior photographic data record system. In that prior system, the nominal speed of recording was twelve hundred binary digits per second. Allowing for the interruptions necessary for shifting from one data track to the next, it is possible with the present invention to record in the order of 200,000,000 binary digits in 3,000 data tracks on a ten and one-half inch diameter photographic disk in a period of approximately ten minutes. A conventional additional time is required for developing and fixing the resultant photographic images.

In order to obtain data packing densities permitting this much information on a single disk, the average radial displacement of the disk 26 between the recording of one data track and the next is only about 0.0003 inch. Each data track stores approximately 70,000 binary digits.

A number of other photosensitive materials may be satisfactorily employed for the photographic disk 26. An outstanding class of new materials which may be employed in the process and apparatus of the present invention may be identified as photoconductive image materials. In the use of photosensitive materials of this class, the absorption of light causes a reversible change (excitation) in the chemical reactivity of the photoconductive material. The change in chemical reactivity may be then used to reduce or otherwise react with an image material which may be applied to the photoconductive material. This reduction or reaction is equivalent to what is normally referred to as development and fixing of the "picture." However, if no image material is applied to react with the photoconductive material, the excitation of the photoconductive material decays, and it returns to the unexposed state and ready for reexposure if desired. Furthermore, unexposed photoconductive materials are not reactive with image material which may be applied to them and therefore they may be later exposed for the recording of additional information without any impairment of photosensitivity. A method and apparatus for photographically recording data employing the photoconductive image material discussed above forms a portion of the subject matter described and claimed in a copending patent application Ser. No. 359,970, filed Apr. 15, 1964, now Patent No. 3,365,706, by Gilbert W. King and assigned to the same assignee as the present application. The contents of that copending patent application are incorporated by reference into the present application. Several examples of materials which are photoconductive semiconductors usable in the above system are for instance: germanium, titanium dioxide, zinc oxide, barium titanate, and others which are named in the above-mentioned copending King patent application.

When using the photoconductive materials mentioned above, certain changes and modifications in the process of the present invention are possible. For instance, it is possible, and sometimes desirable, to prerecord the indexing tracks, such as the continuous tracks 94 and 96 in FIG. 2, and to later add on the data tracks such as 86 through 92 of FIG. 2. The prerecorded indexing tracks may then serve as a means for positioning the data recording beam such as 102 of FIGS. 4 and 5. Furthermore, the employment of these materials also provides the substantial additional advantage that information may be added on to a photographic data record in any desired number of additional photographic recording steps. In each instance, the added information may relate to the information previously recorded in the same area.

Figure 6:
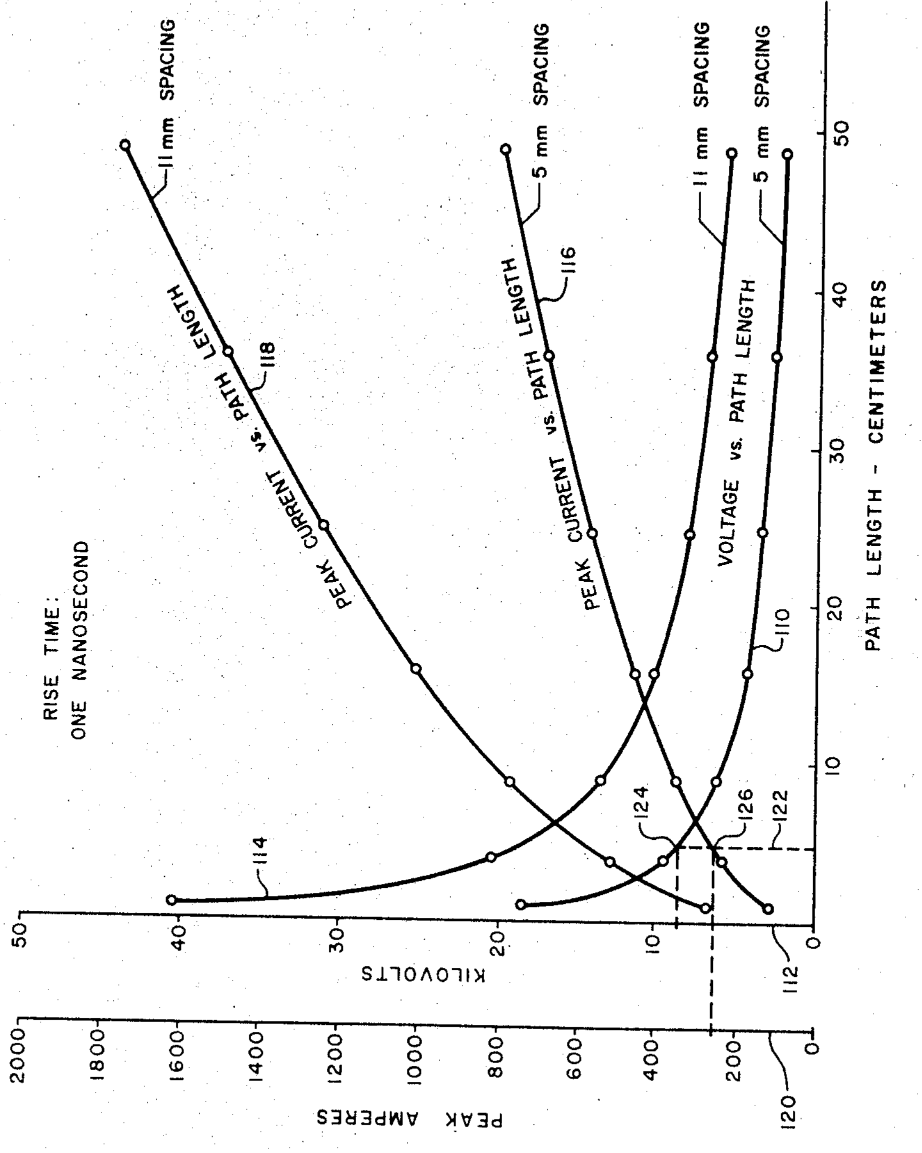
FIG. 6 illustrates Kerr cell voltage and current characteristics which illustrates optimum physical dimensions and electrical characteristics for Kerr cells employed in preferred embodiments of the apparatus of the present invention.

FIG. 6 shows curves relating to the physical dimensions and electrical characteristics of Kerr cells which are useful in apparatus of the present invention. These curves illustrate the advantages of particular physical dimensions in such Kerr cells, as will appear more fully below.

In the prior description of the system of FIG. 1, it was explained that the Kerr cells 14 and 74 are operable in conjunction with the adjacent polarizers 16 and 76 as electrically controllable optical shutters. The control is exercised by voltages derived respectively from the amplifiers 32 and 84. Kerr cell electro-optical shutters usually include a first light polarizer, then the Kerr cell, and then a second light polarizer. The two polarizers are arranged to establish polarization of the light passing therethrough at angles which are approximately ninety degrees displaced from one another so that, in the absence of any modification of the polarization at the Kerr cell, the transmission of light is substantially completely interrupted by the two polarizers. In the system of FIG. 1 of the present invention, no first polarizer is required because the beam of optical radiation from the laser 10 is initially polarized. The polarizer 16 is arranged with an angle of polarization such that it is substantially ninety degrees to the initial angle of polarization of the light from laser 10. Thus, the polarizer 16 substantially com-completely interrupts the transmission of the light beam. The Kerr cell 14 displays the Kerr electro-optical effect in which an electrical potential across the material of the cell in effect rotates the plane of polarization of light passing through the cell. Therefore, when the electro-optical material of the Kerr cell is energized by a sufficient applied voltage, polarized light entering the electro-optical material from the laser is, in effect, rotated to the polarization angle of the polarizer 16 so as to be transmitted through polarizer 16. If such energization and rotation of polarization does not exist, the cooperative action of the initial polarization of the laser beam together with the transverse polarization of polarizer 16 is effective to prevent the transmission of light through the polarizer 16. The Kerr cell 74 and polarizer 76 may operate in the same manner as described for cell 14 and polarizer 16. It is obvious that for either Kerr cell, variations of arrangement may be made. For instance, the voltage energization of the Kerr cell may be used to "close" the shutter rather than opening it. For this variation, the polarizer 16 would be aligned with the initial polarization of light from laser 10.

While various materials display the Kerr electro-optical effect, one of the most useful materials for the Kerr cell in the practice of the present invention has been found to be nitrobenzene.

The birefrigent optical effects within a Kerr cell are accomplished by establishing an electric field through the material of the Kerr cell between two electrodes. One of the most satisfactory configurations for this purpose is to construct the electrodes so that the opposed faces of the two electrodes are in spaced parallel planes which are parallel to the optical path. The electrodes themselves may be rectangular in shape, having the longest dimension in the direction of the optical path of light through the Kerr cell. The electrical field gradient between the electrodes must be relatively high within a Kerr cell in order to accomplish the required degree of birefringence for the electro-optical shutter effect. Most available Kerr cells are provided with a reasonably wide aperture, and they therefore require a very substantial voltage for efficient operation. In accordance with the present invention, however, it has been discovered that a very high Kerr cell switching speed may be obtained at a reasonably achievable voltage level of operation. This is made possible by the adoption of a special Kerr cell design having very closely spaced electrodes (a spacing in the order of five millimeters), and by accomplishing the electro-optical shutter action upon the narrow laser beam before the beam is spread by the lens 18 in the system as illustrated in FIG. 1. At the point where the Kerr cell shutter effect is accomplished, the laser beam has a transverse dimension in the order of three millimeters so that a five millimeter electrode spacing provides workable tolerances to accommodate for minor misalignments.

The curves of FIG. 6 show the voltage and peak current requirements for various physical dimensions of Kerr cells employing nitrobenzene as the birefringent material. Curve 110 shows the voltage requirements for various optical path lengths for a five millimeter electrode spacing. The term "path length" as used here refers to the length of the electrodes in the direction of transmission of the light beam. The voltage values are indicated on the scale 112. The related curve 114 shows how the voltages are increased for an increase in electrode spacing to only eleven millimeters. Imposing the requirement that there must be a rise time in the voltage across the Kerr cell electrodes of one nanosecond (one billionth of a second), the curves 116 and 118 show the peak current requirements of the Kerr cell for the five millimeter and eleven millimeter electrode spacing. The peak current values are indicated on the ordinate scale 120. The curves 110, 114, 116 and 118 are based upon having an electrode width transverse to the optical path which is equal to twice the electrode spacing.

As indicated by the curves of FIG. 6, it is very desirable to maintain the electrode spacing at a minimum dimension in order to keep both the voltage and the peak current requirements at reasonable levels. As further shown by the curves, in selecting the electrode optical path length, a compromise must be made between the voltage requirements and the current requirements because the current increases with path length while the voltage decreases with path length. It is clear from these curves that a favorable comprise dimension for the path length is at about five centimeters, and at least in the range from about three to about ten centimeters. The five centimeter dimension is indicated by the vertical dotted line 122 which intersects the voltage curve 110 at about eight kilovolts as shown at 124. Line 122 also intersects the peak current curve 116 at about two hundred fifty amperes as shown at 126. These voltage and current values are reasonably achievable and therefore are preferred for the Kerr cells employed in the apparatus of the present invention as illustrated in FIG. 1.

It is obviously possible to use materials other than nitrobenzene in the Kerr cells employed in the system of the present invention. Furthermore, other electro-optical effects may be employed to accomplish the electrical shutter action. For instance, one of the other electro-optical effects which may be successfully employed to form a light shutter in place of the Kerr cells shown in FIG. 1 is the "Pockels" effect. This is a linear electro-optic effect. One of the best presently known materials exhibiting this effect is hexamethylenetetramine. This effect in this material is described for instance in the publication, "Applied Optics," volume 2, No. 3, for March 1963, at page 320 in a brief paper by Mr. Richard W. McQuaid.

It is also possible to substitute an injection laser for the laser 10. This is a laser which is caused to emit optical radiation in response to an applied voltage. Therefore, when an injection laser is employed, an electro-optical shutter is unnecessary because the laser itself is turned "on" and "off" to modulate the beam of light to signify the digital data to be recorded. A separate source is then required to provide the light beam 80 as shown in FIG. 1 for recording the servo index track.

Referring again to the system of FIG. 1, the polarizers 16 and 76 are preferably composed of glass and are carefully selected to be particularly effective for light of the wave length received from the laser 10. Polarizers of this type are commercially available from Karl Lambrecht of 3959 Lincoln Ave., Chicago 13, Ill., under the product designation of the Glan laser prism.

A very satisfactory lens for the final focusing lens 24 has been found to be a twenty power microscope objective.

The amplifiers 32, 84 and 66 may be of conventional construction. Accordingly, details of these amplifiers are not disclosed here.

While no control or energizing connections are shown for the disc motor 30, it will be understood that, if desired, the motor 30 may be operated under the control of the memory center processor 36.

Because of the fact that the entire recording process proceeds with great rapidity, their being only about one-tenth of a second required for changing from one data track to the next, it is unnecessary and undesirable to stop the motor 30 between the recordation of adjacent tracks, and the motor 30 is generally continued in constant speed rotation during the entire data recording process. While a number of references are made above to a constant speed of rotation of the motor 30, the constancy of this motor speed at any particular rate is not vital because the rotation of the motor and the disc 26 constitutes the synchronization time clock for the system by virtue of the signals available from the magnetic drum 38.

It is one of the important features and advantages of the present invention that the operation of the memory center processor 36 in controlling the storage of data upon the photographic disc 26 is accurately synchronized with the rotation of the disc 26, regardless of minor speed variations in the rotation of the disc 26. This synchronization is accomplished by means of the magnetic "marks" stored on the magnetic drum 38 which are detected by the magnetic reading heads 42 and 52 to provide synchronization signals. The average speed at which the system may be operated will depend upon the efficiency of light output of the laser 10 and upon the exposure speed of the particular photographic medium used for the disc 26. If desired, a speed control may be employed with the motor 30 for adjusting the speed of the disc 26 and for thereby adjusting the exposure times for data storage. It is a particular advantage of the present invention that if the speed of the motor 30 is varied in this way, the speed of operation of the entire data storage system is correspondingly adjusted because of the timing signals derived from the drum 38. Thus, it may be said that the operation of the system is synchronized with the speed of rotation of the photographic disc 26 and the supporting disc 28.

The synchronizing material medium has been disclosed in FIG. 1 as being in the form of a drum 38, but it will be recognized that it is perfectly feasible to use some other circular structure, such as a disc, for this purpose. Furthermore, it is actually preferred to have the indexing "marks" recorded either magnetically or photographically upon the recording disc 26 itself. In this way, there is a completely foolproof synchronization of the recordation of the data with the rotation of the disc 26. For instance, slippage of the disc 26 upon the support disc 28 is of no consequence when the index marks are on the disc 26 itself. This is particularly advantageous also for the system described above employing photoconductive materials where information may be added to the disc on a number of occasions in separate photographic recording steps. Foolproof indexing is thereby possible for each of the subsequent recording steps.

While the above discussion of data storage refers to the storage of binary digital information, it is quite obvious that the information may be stored in the form of various binary codes which represent numbers in another radix such as radix ten. Furthermore, it is often convenient to use a code corresponding to the code employed in the prior storage of the information in the memory center processor which may be commonly used for storage media, such as paper tape, or punched cards, or the like.

Because of the speed, accuracy, and high density with which the present system is capable of recording data, it is also possible to modulate the data light beam "on" and "off" to accomplish direct storage of analog information in the form of photographic patterns representing pulse-time modulation, frequency modulation, or pulse-position modulation. The dark or exposed portions of the photographic data record track may represent, for instance, a clipped half-wave frequency modulated carrier, the variations in spacing between the recorded "spots" representing the modulation data.

We claim:

1. Data storage apparatus comprising:

(A) a laser for generating a narrow beam of coherent polarized light;

(B) a Kerr cell and a light polarizer respectively arranged to be in the path of the beam of light from said laser, (1) said polarizer being arranged with an angle of polarization substantially perpendicular to the initial direction of polarization of the light from said laser to thereby interrupt the transmission of the polarized light beam from said laser;

(2) said Kerr cell being arranged to accomplish an effective rotation of the polarization of the light beam to provide for transmission of said light beam through said polarizer in response to electrical signals received by said Kerr cell;

(C) a rotatable support arranged to support and rotate a photosensitive medium in the path of the light beam transmitted through said polarizer;

(D) a second light beam source arranged for continuous transmission of a second beam to the photosensitive medium to photographically record a continuous servo indexing strip;

(E) a common focusing lens positioned and arranged for focusing both of the light beams together upon the photographic medium; and (F) a memory center processor including a source of data to be recorded connected to control the operation of said Kerr cell in accordance with the data to be recorded.

2. A system for storing data in a read-only memory record comprising:

(A) a laser to provide a source of a light beam;

(B) means for modulating the light beam in accordance with the data to be stored;

(C) a source of data to be stored;

(D) means for controlling said modulating means in response to the data of said source;

(E) means positioned for optically spreading the modulated light beam;

(F) an apertured masking means positioned in the path of the spread modulated beam for producing a light spot having sharply defined edges by diffraction of said beam at the outlines of said aperture;

(G) means for generating a second beam of light which is unmodulated for recording an indexing servo strip adjacent to the data record;

(H) a motor driven rotatable support means for a disk of photo-responsive material, said support means being positioned and arranged to support the disk of photo-responsive material in a position to intercept both of the light beams at a predetermined plane of focus; and (I) a common focusing means positioned and arranged to receive both of said light beams and to focus both of said light beams to said predetermined plane of focus, the focusing of said light beams being in a direction substantially parallel to the axis of rotation of said disk supporting means.

3. A system for storing data as set forth in claim 2 in which said means for controlling said modulating means is operable to present said data to said modulating means in the form of pulses having patterns of pulse duration and spacing representative of a carrier wave modulated with analog information to be stored.

4. A data storage apparatus as set forth in claim 2 in which said modulating means comprises a Kerr cell with an auxiliary polarizer, said Kerr cell including spaced mutually parallel electrodes, and said Kerr cell comprising nitrobenzene as the electro-optically active material thereof.

5. A data storage apparatus as set forth in claim 4 in which said mutually parallel electrodes of said Kerr cell have a (A) spacing perpendicular to the optical axis in the order of five millimeters;

(B) each of said electrodes have a width in a direction perpendicular to said optical axis in the order of ten millimeters; and (C) each of said electrodes have a length parallel to the direction of said optical axis in the range from about three centimeters to about ten centimeters.

6. A data storage apparatus as set forth in claim 2 in which said modulating means is a crystal of hexamethylenetetramine which displays the linear electro-optic Pockels effect.

7. A data storage apparatus in accordance with claim 2 in which said modulating means is combined with said laser and in which said combined modulating means and laser comprises an injection laser.

8. A photographic data storage apparatus comprising:

(A) a laser to provide a source of a narrow beam of polarized coherent light;

(B) a Kerr cell positioned and arranged to intercept the beam of light from said laser;

(C) an optical light polarizer positioned and arranged to receive and intercept the beam of light after it passes through said Kerr cell, the angle of optical polarization of said polarizer being transverse to the direction of polarization of the light from said laser;

(D) a source of data to be recorded;

(E) a memory center processor connected to receive data from said data source and connected to control the operation of said Kerr cell to modulate the transmission of the light beam through said polarizer;

(F) an optical spreading lens for spreading the rays of said modulated light beam apart after transmission through said polarizer;

(G) an apertured optical mask positioned and arranged in the path of the spread light beam for producing clearly defined marginal edges in the images diffraction pattern of said light beam;

(H) a focusing lens positioned and arranged in alignment with said mask for focusing the modulated light beam to a predetermined plane of focus which is perpendicular to said light beam;

(I) a rotatable support for supporting a photographic medium with a photosensitive surface for rotation at said plane of focus;

(J) a beam splitter in the form of a fractionally reflective mirror arranged at substantially a forty-five degree angle between said laser and said Kerr cell for the purpose of reflecting a fraction of the radiation from said laser into an auxiliary light beam path;

(K) optical reflectors arranged for directing said auxiliary beam of light through said auxiliary light beam path and back to a path which is substantially parallel to the path of the modulated light beam to thereby photographically record a continuous servo index band adjacent to the recorded data; and (L) a second Kerr cell and a second polarizer respectively arranged and positioned in said auxiliary light beam path to act as a separate electro-optical shutter, said second Kerr cell being connected to said memory center processor for operation in response thereto to interrupt said auxiliary light beam.

9. A data storage system for storing data in a series of concentric data tracks comprising:

(A) a laser to provide a source of a light beam for photographic storage;

(B) means for modulating the light of said laser in accordance with the digital data to be stored;

(C) a source of data to be stored;

(D) means for controlling said modulating means in response to the data of said source;

(E) means positioned for optically spreading the modulated light beam;

(F) an apertured masking means positioned in the path of the spread modulated beam for producing sharply defined edges in the imaged diffraction pattern of said beam by diffraction at the outlines of said aperture;

(G) means for generating a second beam of light which is unmodulated for recording an indexing servo track adjacent to the data record track;

(H) a motor driven rotatable support means for a disk of photo-responsive material;

(I) said support means being positioned and arranged to support the disk of photo-responsive material in a position to intercept both of the light beams at a predetermined plane of focus;

(J) a common focusing means positioned and arranged to receive and focus both of said light beams to said predetermined plane of focus, the focusing of said light beams being in a direction substantially parallel to the axis of rotation of said disk supporting means;

(K) a synchronizing means connected to control the operation of said modulation control means in synchronization with the rotation of said disk supporting means;

(L) means operable after each full data recording rotation of said rotatable support for temporarily interrupting the storage of data and for moving said rotatable support radially to establish a new data track radius;

(M) and means for interrupting said unmodulated light beam during the recordation of every second data track.

10. A photographic data storage apparatus for storing data in a plurality of concentric tracks on the face of a photographic disk comprising:

(A) a laser to provide a source of a narrow beam of polarized coherent light;

(B) a Kerr cell positioned and arranged to intercept the beam of light from said laser;

(C) an optical light polarizer positioned and arranged to receive and intercept the beam of light after it passes through said Kerr cell;

(D) the angle of optical polarization of said polarizer being transverse to the direction of polarization of the light from said laser;

(E) a source of digital data to be recorded;

(F) a memory center processor connected to receive data from said data source and connected to control the operation of said Kerr cell to modulate the transmission of the light beam through said polarizer;

(G) an optical spreading lens for spreading the rays of said modulated light beam apart after transmission through said polarizer;

(H) an apertured optical mask positioned and arranged in the path of the spread light beam for producing clearly defined marginal edges in the imaged diffraction pattern of said light beam;

(I) a focusing lens positioned and arranged in alignment with said mask for focusing the modulated light beam to a predetermined plane of focus which is perpendicular to said light beam;

(J) a rotatable support for supporting a photographic medium with a photosensitive surface for rotation at said plane of focus;

(K) a beam splitter in the form of a fractionally reflective mirror arranged at substantially a forty five degree angle between said laser and said Kerr cell for the purpose of reflecting a fraction of the radiation from said laser into an auxiliary light beam path;

(L) optical reflectors arranged for directing said auxiliary beam of light through said auxiliary light beam path and back to a path which is substantially parallel to the path of the modulated light beam to thereby photographically record a continuous servo index track adjacent to each track of recorded data;

(M) a second Kerr cell and a second polarizer respectively arranged and positioned in said auxiliary light beam path to act as a separate electro-optical shutter, said second Kerr cell being connected to said memory center processor for operation in response thereto to interrupt said auxiliary light beam;

(N) a synchronizing control comprising a magnetic medium connected for rotation with said rotatable support and arranged to contain magnetically recorded synchronizing information, said synchronizing control being connected to said memory center processor to provide synchronizing signals for controlling the operation thereof;

(O) said rotatable support being radially adjustable after the exposure of each data track for establishing a larger radius for each subsequent data track until a predetermined number of data tracks are exposed on each photographic medium.

References Cited

UNITED STATES PATENTS

| | | | |
|---|---|---|---|
| 2,102,708 | 12/1937 | Howle | 346—108 X |
| 3,154,371 | 10/1964 | Johnson | 346—108 |
| 3,181,170 | 4/1965 | Akin | 346—108 |
| 3,220,013 | 11/1965 | Harris | 346—107 |
| 3,235,878 | 2/1966 | Jones | 346—33 |
| 3,256,524 | 6/1966 | Stauffer | 346—76 |
| 3,262,122 | 7/1966 | Fleisher et al. | 346—1 |
| 3,266,393 | 8/1966 | Chitayat | 95—1.1 |
| 3,365,706 | 1/1968 | King | 340—173 |

RICHARD B. WILKINSON, *Primary Examiner.*

JOSEPH W. HARTARY, *Assistant Examiner.*

U.S. Cl. X.R.

331—94.5; 340—173; 346—108; 350—150